United States Patent
Karlsson et al.

(10) Patent No.: US 10,648,557 B2
(45) Date of Patent: May 12, 2020

(54) METHOD FOR AUTOMATIC CALIBRATION OF AUTOMATIC TRANSMISSION

(71) Applicant: VOLVO TRUCK CORPORATION, Göteborg (SE)

(72) Inventors: Lars Karlsson, Göteborg (SE); Johan Bjernetun, Mölnlycke (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 0 days.

(21) Appl. No.: 16/290,919

(22) Filed: Mar. 3, 2019

(65) Prior Publication Data
US 2019/0195356 A1    Jun. 27, 2019

Related U.S. Application Data

(62) Division of application No. 14/906,932, filed as application No. PCT/EP2013/002448 on Aug. 14, 2013, now Pat. No. 10,288,170.

(51) Int. Cl.
*F16H 61/00* (2006.01)
*F16H 61/30* (2006.01)
(Continued)

(52) U.S. Cl.
CPC ....... *F16H 61/30* (2013.01); *B60W 30/18054* (2013.01); *F16H 61/2807* (2013.01);
(Continued)

(58) Field of Classification Search
CPC ................ F16H 61/2807; F16H 59/68; F16H 2061/0053; F16H 2061/0062; F16H 2061/283
See application file for complete search history.

(56) References Cited

U.S. PATENT DOCUMENTS 6,301,537 B1 * 10/2001 Walker .................... F16H 59/70
701/51
6,615,114 B1 *  9/2003 Skiba ..................... E02F 9/2025
172/2
(Continued)

FOREIGN PATENT DOCUMENTS

CN    102829174 A    12/2012
CN    103104695 A     5/2013
(Continued)

OTHER PUBLICATIONS

Indian Official Action (dated Jul. 1, 2019) for corresponding Indian App. 201627002756.
(Continued)

*Primary Examiner* — Edwin A Young
(74) *Attorney, Agent, or Firm* — Venable LLP; Jeffri A. Kaminski

(57) ABSTRACT

A method for automatic calibration of a position detection sensor of an automatic transmission including a gearshift actuator, the method including registering, using the position detection sensor, the position of the gearshift actuator upon power-up of the transmission; and performing a calibration of the position detection sensor if the registered position of the gearshift actuator is outside a predetermined expected position range of the gearshift actuator or within a predetermined abnormal position range of the gearshift actuator.

3 Claims, 4 Drawing Sheets

(51) Int. Cl.
  B60W 30/18 (2012.01)
  F16H 61/28 (2006.01)
(52) U.S. Cl.
  CPC ....... *B60Y 2304/09* (2013.01); *B60Y 2400/76* (2013.01); *F16H 2061/283* (2013.01)

(56) References Cited

U.S. PATENT DOCUMENTS

| | | | |
|---|---|---|---|
| 6,717,417 | B2 | 4/2004 | Jungbauer et al. |
| 2003/0056614 | A1* | 3/2003 | Babin ................. F16H 59/105 74/473.28 |
| 2004/0128051 | A1 | 7/2004 | Boll et al. |
| 2005/0143881 | A1 | 6/2005 | Taulbut |
| 2006/0162476 | A1 | 7/2006 | Zimmermann et al. |
| 2009/0018737 | A1 | 1/2009 | Amisano et al. |
| 2012/0143447 | A1 | 6/2012 | Litscher et al. |

FOREIGN PATENT DOCUMENTS

| | | |
|---|---|---|
| DE | 102006002492 A1 | 8/2006 |
| DE | 102011006560 A1 | 10/2012 |
| JP | 2004-084890 A | 3/2004 |
| JP | 2008-267501 A | 11/2008 |
| JP | 2008-286251 A | 11/2008 |
| WO | 03081090 A1 | 10/2003 |
| WO | 2004/079233 A1 | 9/2004 |
| WO | 2010/027321 A1 | 3/2010 |

OTHER PUBLICATIONS

Office Action dated Jul. 1, 2019 in corresponding Indian Patent Application No. 201627002756.
International Search Report dated Jul. 8, 2014 in International Patent Application No. PCT/EP2013/002448.
Written Opinion dated Jul. 8, 2014 in International Patent Application No. PCT/EP2013/002448.
International Preliminary Report on Patentability dated Dec. 17, 2015 in International Patent Application No. PCT/EP2013/002448.
Chinese Official Action dated Feb. 8, 2017 is corresponding Chinese Patent Application No. 201380078823.X [Cited in Parent].

* cited by examiner

METHOD FOR AUTOMATIC CALIBRATION OF AUTOMATIC TRANSMISSION

The present application is a divisional of U.S. patent application Ser. No. 14/906,932, filed Jan. 22, 2016, which is the U.S. national stage of International Application PCT/EP2013/002448, filed Aug. 14, 2013, both of which are incorporated by reference.

BACKGROUND AND SUMMARY

This disclosure relates to a method for automatic calibration of a position detection sensor of an automatic transmission comprising a gearshift actuator. The disclosure also relates to an automatic transmission being calibrated by such a method, as well as a vehicle comprising such an automatic transmission.

This is advantageous in optimising the performance of automatic transmissions, especially for trucks, semi-trucks, road trains and the like, but may also be used in other vehicles.

Advancements in transmission technology allows for more and more effective implementations of automatic and semi-automatic transmissions in vehicles which assist in promoting more optimal operation of such vehicles. This aid in improving fuel economy, reducing the time spent accelerating or decelerating to a desired speed, and reducing fatigue in drivers who can focus on the road instead of the operation of the transmission. Automatic and semi-automatic transmissions have lately also been introduced into heavier vehicles such as trucks, semi-trucks, road trains and the like, and made feasible as a result of improvements to these transmissions.

In order for automatic transmission to be feasible in such heavy vehicles, advanced control units, often called Gearshift Control Units (GCU), which control the transmission may be necessary. To service these transmissions, the GCU may need to be removed, possibly to allow replacement of the GCU, access to the transmission or to service the GCU unit itself. Removing or replacing the SCUD is a complicated task, as it is connected to and controls the actuation of the different gears of the transmission, and in the case of vehicles which include a splitter for multiple gear levels such as e.g. a semi-truck, it also controls the actuation of the splitter. The operation of these gearshift actuators is critical to the correct operation of the automatic transmission, as they enable the GCU to change gears. The automatic transmission may be equipped with position detection sensors which are used for controlling and verifying the position of the gearshift actuators, and to ensure correct operation, the position detection sensors have to be calibrated.

JP2004084890A discloses storing the characteristics of an automatic transmission electronic control unit to prevent behavioural change of the transmission when parts are replaced, substituting the variation characteristics of the previous part with an inputted variation characteristic.

This solution involves transfer of data from one transmission electronic control unit to another control unit to ensure a similar operation of the replaced unit. However, further improvements with respect to service and repair of transmission units are desired.

It is desirable to provide a more effective method for automatic calibration of an automatic transmission.

This disclosure concerns a method for automatic calibration of a position detection sensor of an automatic transmission comprising a gearshift actuator, the method comprising registering, using the position detection sensor, the position of the gearshift actuator upon power-up of the transmission; and performing a calibration of the position detection sensor if the registered position of the gearshift actuator is outside a predetermined expected position range of the gearshift actuator or if the registered position of the gearshift actuator is within a predetermined abnormal position range of the gearshift actuator.

Each gearshift actuators of the automatic transmission is often pneumatically controlled using at least one directional control valve, which received control signals from a microprocessor of the gearshift control unit. The control signal of the microprocessor may typically correspond to two or three predetermined positions of the gearshift actuator, such as neutral, left engaged and/or right engaged. The at least one directional control valve is arranged to control the gearshift actuator accordingly, i.e. to position the gearshift actuator in a predetermined neutral, left and/or right position, which positions corresponds to different longitudinal actuating position of the gearshift actuator. The transmission further comprises position detection sensor for monitoring the actuating position of the gearshift actuators. Normally, the actuating position of each gearshift actuator is monitored by an individual position detection sensor. Upon issuing a command by the electronic control unit to move a gearshift actuator to a certain actuating position, the position detection sensors provide feedback to the electronic control unit about the time point when the desired actuation position of the gearshift actuator was attained. Any discrepancy between the commanded actuating position and actual actuating position may consequently immediately be determined.

Upon removal of the gearshift control unit and potential service or repair thereof the position detection sensors associated with the gearshift actuators may be replaced, renewed, dislocated or the like, such that the output signal of any position detection sensor no longer with certainty can be associated with any physical actuation position of the gearshift actuator. Calibration of the position detection sensors are consequently required after assembly of the transmission and gearshift control unit to certify that the output signal of each position detection sensor can be associated with a specific actuation position of the corresponding gearshift actuator.

Calibration can for example be performed by the electronic gearshift control unit by commanding the gearshift actuator to consecutively attain the different predetermined actuating positions and registering the output signal of the position detection sensor for each predetermined actuating position, such that a unique output signal can be coupled to each unique actuating position of the gearshift actuator. Alternatively, only the actuating position corresponding to the neutral position is checked.

One solution is to perform calibration of the position detection sensors at each transmission power-up for ensuring that the position detection sensors are always correctly calibrated. However, this calibration strategy tends to slow down transmission power-up and the calibration is in most circumstance unnecessary. Another calibration strategy is to manually initiate calibration after transmission service or repair but there is a risk that the service technician forgets to initiate the calibration.

With the method according to the disclosure the calibration of the position detection sensor is performed automatically when required. The basic idea of the disclosure is the fact that the gearshift actuators often exhibit a different actuating position after transmission service or repair, or when the gearshift control unit was temporarily dismounted from the transmission housing. During a normal engine shut down each gearshift actuator is controlled to exhibit a predetermined actuating position. However, the gearshift actuators often have to exhibit a different actuating position for enabling assembly of the gearshift control unit with the transmission housing. Consequently, simply be registering the output signal of the uncalibrated position detection sensors upon transmission power-up, an indication that a calibration of the position detection sensors can be determined. When the registered position of the gearshift actuator is outside a predetermined expected position range of the gearshift actuator then this is strong indication that a calibration is required. Similarly, when the registered position of the gearshift actuator is within a predetermined abnormal position range then this also is a strong indication that a calibration is required. Automatic calibration of the position detection sensors according to the disclosure improves start up times of the automatic transmission because calibration is only performed when needed, and at least not upon each transmission power-up. This calibration strategy thus improves start-up times as calibration will only be performed in certain circumstances.

This disclosure further concerns a method for automatic calibration of a position detection sensor of an automatic transmission comprising a gearshift actuator, wherein the method comprising performing a calibration of the position detection sensor associated with the gearshift actuator if, upon power-up of the transmission, a recent request for preparing the automatic transmission for disassembly can be detected.

This alternative solution for identifying an indication that a calibration of the position detection sensors is required involves an analysis of the recent command history received by the gearshift control unit. Frequently at least one of the gearshift actuators must be set in a specific actuating position for enabling the gearshift control unit to be removed from the transmission housing. The reason for this is that the shift forks of the gearshift control unit protrude out of the gearshift control unit and into the transmission housing in the assembled state. The at least one opening in the transmission housing receiving the shift forks is generally dimensioned to be as small as possible for avoiding unnecessary weakening of the structural rigidity of the transmission housing. Consequently, for being able to withdraw the shift forks out through the opening of the transmission housing at least one of the shift forks often must be set in a specific actuating position. For preparing dismounting of the gearshift control unit a specific control command is received by the gearshift control unit for preparing the transmission for disassembly. In response to this control command the gearshift control unit controls the gearshift actuators according to a predetermined pattern thereby enabling withdrawal of the gearshift control unit and shift forks without further displacement of the shift forks being necessary. The alternative solution for identifying an indication of need for calibration of the position detection sensors involves thus an analysis of the recent control commands received by the gearshift control unit upon power-up of the transmission. If a recent request, i.e. control command for preparing the transmission for disassembly can be detected a calibration of the position detection sensor is performed.

The disclosure also concerns automatic transmission arranged to perform the methods described above, as well as a computer program comprising program code means for performing all the steps of the methods when said program is run on a computer, a computer program product comprising program code means stored on a computer readable medium for performing all the steps of the methods when said program product is run on a computer, and a computer system for implementing the described methods.

Further advantages are achieved by implementing one or several of the features of the dependent claims.

According to an aspect of the disclosure, the method further comprises registering the position of at least two gearshift actuators at power-up of the transmission, and performing a calibration of the associated position detection sensor if each registered position of the at least two gearshift actuators is outside a predetermined expected position range or if each registered position of the at least two gearshift actuators is within a predetermined abnormal position range. This method results in a decreased risk for performing a calibration due to measurement errors of the position detection sensor. The position detection sensors all involve a certain level of measurement error. For example, the output signal of the sensors varies with temperature. Moreover, the output signal of sensor more or less accurately represents the true condition of the measured object, which accuracy often is defined in terms of for example +/− a certain percentage. If the decision to perform a calibration is based on the output signal of two position detection sensors instead of a single sensor, the likelihood of an unnecessary calibration is reduced due to the reduced likelihood that the output signal of both sensors simultaneously involves a sufficiently large measurement error.

The method according to the disclosure is usable for a variety of different automatic transmissions arranged to shift gears using actuators.

BRIEF DESCRIPTION OF DRAWINGS

In the detailed description of the disclosure given below reference is made to the following figure, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiment, but are applicable on other variations of the disclosure.

Figure 1:
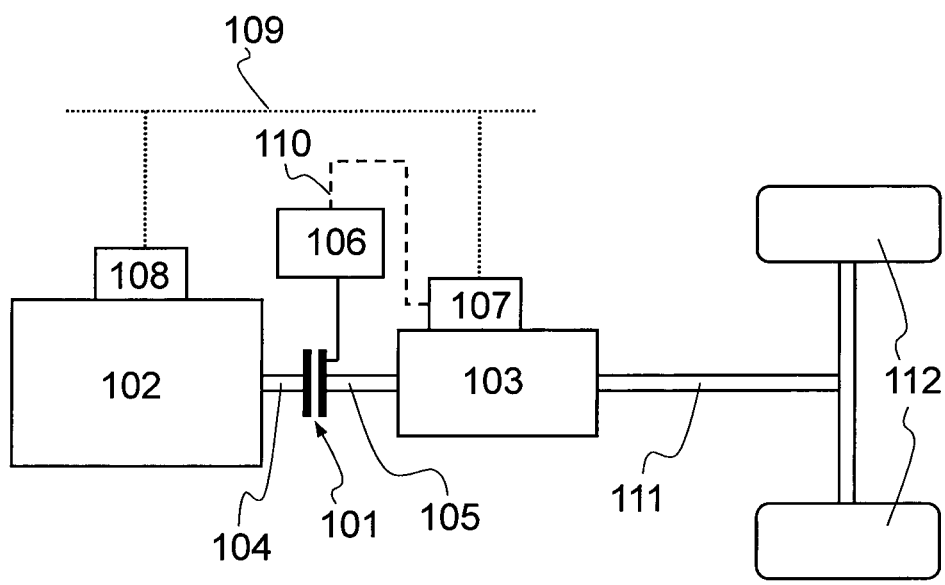
FIG. 1 shows a schematic overview of a drive train of a vehicle.

FIG. 1 shows a schematic overview of an example of a drive train in a vehicle. A master clutch 101 is situated between an engine 102 and a transmission 103, connecting a crankshaft 104 of the engine 102 to a rotatable transmission input shaft 105 of the transmission 103 of the vehicle.

A transmission output shaft 111 connects the transmission 103 with driving wheels 12 of the vehicle. When the clutch 101 is in an engaged position, it transfers torque between the crank shaft 104 and transmission input shaft 105, and when the clutch is in a disengaged position, the crank shaft 104 and input shaft 105 are decoupled from each other and no torque is transferred between them. The actuating position of the clutch 101 is mechanically controlled by a clutch actuator mechanism 106. The clutch actuator mechanism 106 is in turn electronically controlled by a gearshift control unit 107. An engine control unit 108 controls the engine 102. The two control units 107; 108 communicate with each other for example via a controller area network (CAN) bus 109. Alternatively, both the engine and transmission may be controlled by a single control unit. Signal cables 110 may be used for transmitting from the gearshift control unit 107 to the clutch actuator mechanism 106.

Figure 2:
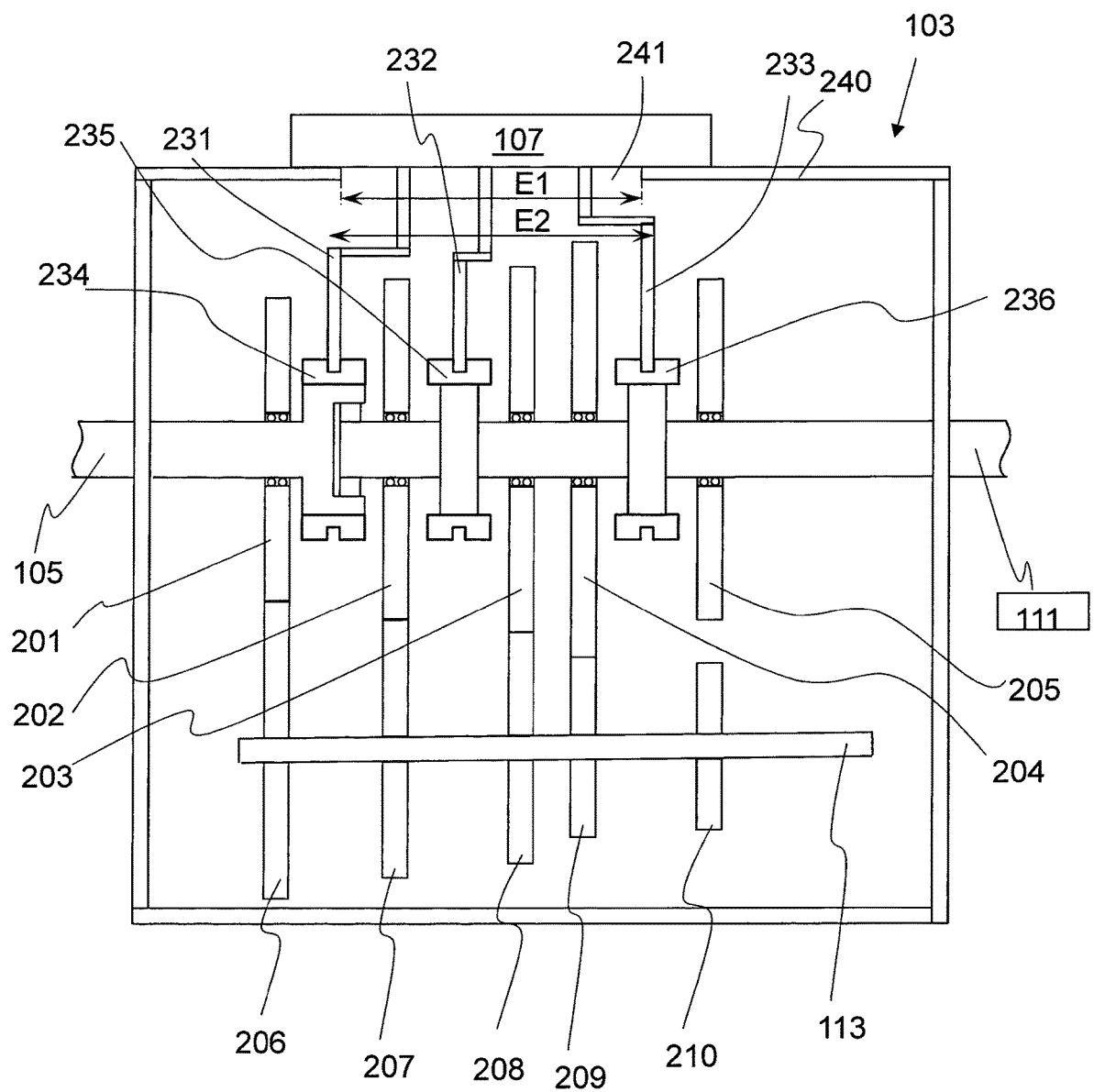
FIG. 2 shows a schematic view of a gearbox.

FIG. 2 shows a schematic view of an example of a transmission 103 in a vehicle. The rotatable transmission input shaft 105 of the transmission 103 is shown. The transmission output shaft 111 is arranged coaxial with and rotatably connected to the input shaft and being rotatably connected with the driving wheels 112 of the vehicle. The transmission input shaft 105 and transmission output shaft 111 are equipped with a plurality of loose gearwheels 201, 202, 203, 204, 205 which are connected to the input shaft 105 and output shaft 111 with bearing means, such that the loose gearwheels are rotatably arranged on respective shaft. A countershaft 113 positioned parallel with the input and output shafts 105, 111 and is equipped with a plurality of gearwheels 206, 207, 208, 209, 210 which are rotatably attached to and move synchronously with the countershaft 113. A transmission housing 240 covering and supporting the shafts and gearwheels. A gearshift control unit 107 is removably attached to the exterior side of the housing 240, for example on a top side of the housing 240. The gearshift control unit 107 comprises a microprocessor programmed to automatically control gear shift operation of the transmission 103. The gearshift control unit 107 receives input from various other parts of the vehicle, such as engine control unit and accelerator pedal actuating position, and selects suitable conversion ratio between the input and output shafts 105, 111 using the plurality of gearwheels of the transmission, as is well known to the person skilled in the art. The gearshift control unit 107 is farther equipped with a plurality of pneumatically operated gearshift actuators (non-showed), each of which is connected to an individual shift fork 231, 232, 233. The microprocessor controls the motion of the gearshift actuators by means of direction control valves that are also integrated within the gearshift control unit 107. The shift forks 231-233 extend outside from the gearshift control unit 107 and are arranged to be inserted through an opening 241 in a side wall of the housing 240 for controlling the axial position of a plurality of coupling sleeves 234, 235, 236 of the transmission. The coupling sleeves 234-236 are rotationally locked and axially displaceable to the shaft on which they are positioned, for example by means of axially aligned splines located on an exterior side of the shaft and interior side of the coupling sleeves. Thereby the coupling sleeves may be axially displaced while still being able to transfer torque to and from the shaft.

To change gears, i.e. to change the conversion ratio between the transmission input and output shafts 105, 111 the gearshift control unit 107 controls its respective gearshift actuator 270 to actuate the shift forks 231, 232, 233 which in turn axially moves the coupling sleeves 234, 235, 236, causing the coupling sleeves 234, 235, 236 to either be located in an axial position corresponding to a neutral position, i.e. a position where the coupling sleeve 234-236 is not engaged with any gearwheel 201-205, or be located in an axial position corresponding to an engaged position, i.e. a position where the coupling sleeve is engaged with a gearwheel 201, 202, 203, 204, 205. The coupling sleeve 234-236 comprises dog teeth or similar coupling means located on at least one axial side of the coupling sleeve 234, 235, 236 for enabling a rotational locking between the gearwheel 201-205 and coupling sleeve 234-236. As a coupling sleeve 234, 235, 236 engage one of the gearwheels 201, 202, 203, 204, 205, that gearwheel will move synchronously with the shaft on which it is located. Torque may then be transmitted from the input shaft 105, to the countershaft 113 and further to the output shaft 111 and onwards to the driving wheels 112. The coupling sleeves 234, 235, 236 can also engage the input shaft 105 and the output shaft 111 in such a way that torque is transmitted directly from the input shaft 105 to the output shaft 111. Thus the gearshift control unit 107 controls the motion of the gearshift actuators which are rigidly connected to the shift forks 231, 232, 233, which are used for selecting the gears of the transmission 103. The gearshift control unit 107 may further be arranged to control the clutch actuator mechanism 106, as well as communicating with other control units such as the engine control unit, for example by being connected to the CAN bus 109. The gearbox 103 may further be connected to range transmission that comprises for example two fixed gears, such that the total number of possible gears is doubled compared with a transmission without a range transmission.

The transmission 103 is further equipped with position detection sensors, each generating an output signal corresponding to the position of an individual gearshift actuator or shift fork 231-233.

The manner in which a position detection sensors registers the position of the gearshift actuators or shift forks 231-233 can be performed in several different manners, for example by being arranged to directly measure the actuating position of the gearshift actuator, or by measuring the position of a member connected to the gearshift actuator, such as the shift forks 231, 232, 233 or coupling sleeve 234, 235, 236. By installing the position detection sensors integrated in the housing of the gearshift actuators a reliable, compacts and robust design is provided, where the sensors are located close to die microprocessor for avoiding lengthy signal cables. However, a solution where the position detection sensors measure the physical position of the shift forks has the advantage of for example being able to detect shift fork damages.

The position detection sensors are important to the reliability of the automatic transmission, as they are used to verify that the gear actuation is working as intended. The combination of the use of expected position stored in the transmission control unit 107 with that of the sensor inputs reduce the risk of potential failure of the transmission control unit 107, since if these values differ, something may be malfunctioning within the transmission. In order to ensure that the position detection sensors are operating correctly, they may require calibration.

Calibration of the position detection sensors can add to the power-up time of the vehicle, which is undesirable. It is more efficient to only perform this calibration when it is deemed necessary, thus a comparison with the predetermined position ranges is performed. Further, calibration is likely to be necessary if the transmission has been removed, repaired or opened.

One solution for avoiding unnecessary time consuming calibration of the transmission 103 is to stop automatic calibration of the position detection sensors at each transmission power-up, and instead use indicators for when a calibration of the sensors actually is necessary or recommendable. One efficient indicator for triggering calibration of the sensors is detection of removal of the gearshift control unit 107 from the transmission housing 240.

Upon removal of the gearshift control unit 107 for any reason the shift actuators may very well be displaced from their standard position which they are controlled to occupy at transmission and/or engine shut down. For example, if a service technician replaces an actuator or the like the actuator will likely not occupy the same position as before removing the gearshift control unit 107.

Figure 3:
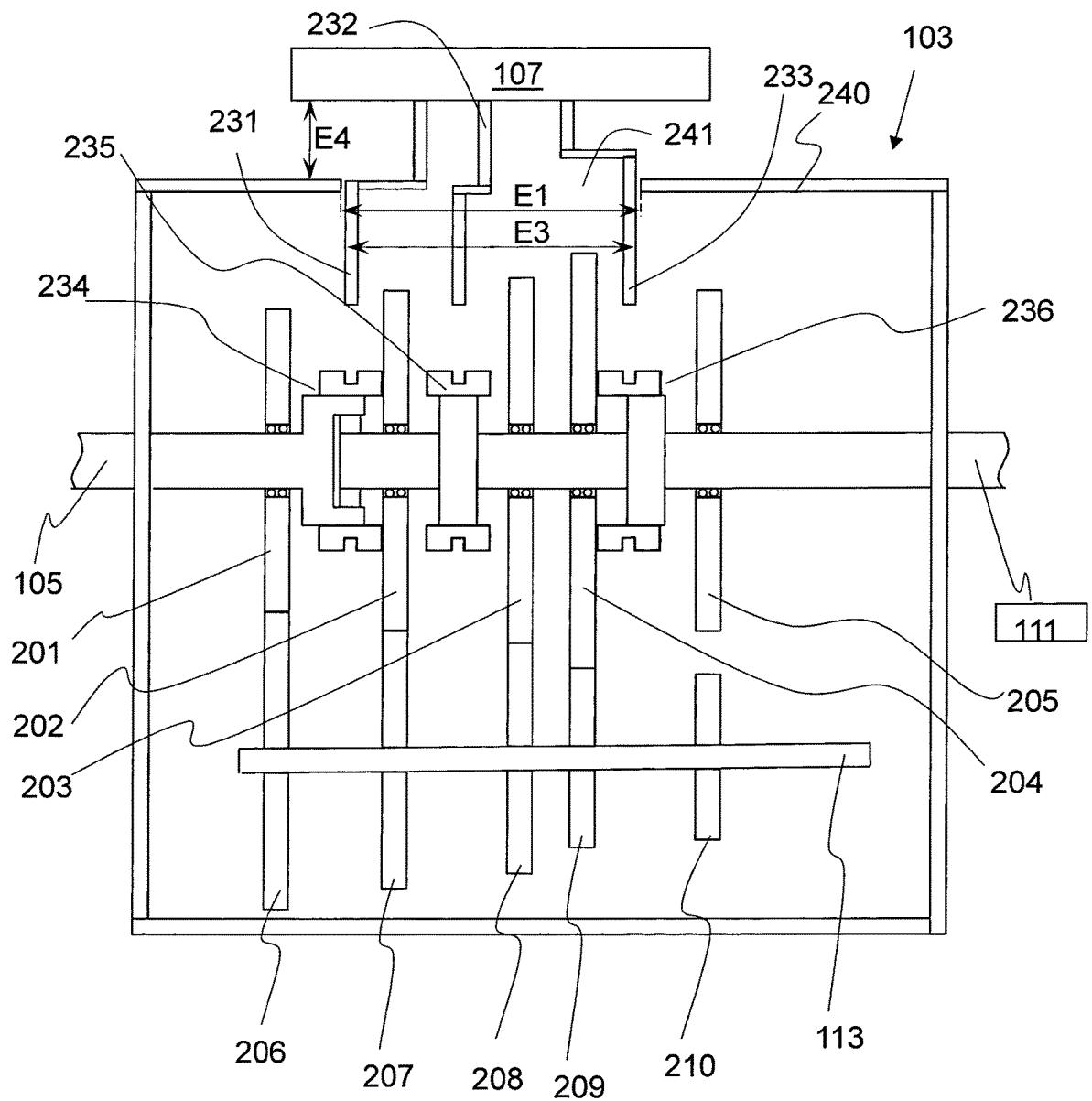
FIG. 3 shows a schematic view of the gearbox with the GCU partly removed.

Another reason for displacement of one or more shift actuators during removal of the gearshift control unit 107 is the potential requirement to displace at least one shift actuator to enable removal and assembly of gearshift control unit 107 to the transmission housing 240. The opening 241 on the transmission housing 240 may be dimensioned in such a way as to only allow the transmission control unit 107 to be removed from the gearbox 103 when the gearshift actuators 270, and thus the shift forks 231, 232, 233, and coupling sleeves 234, 235, 236 are in certain predetermined expected position ranges, as seen in FIGS. 2 and 3. In the disclosed example in FIG. 2 and FIG. 3, one of the shift forks 231 must be manually or electronically controlled to occupy a actuating position where the associated coupling sleeve 234 becomes engaged with a gearwheel 202 corresponding to a high-gear of a transmission splitter mechanism, and another of the shift forks 233 must be manually or electronically controlled to occupy an actuating position where the associated coupling sleeve 236 becomes engaged with a gearwheel 204. Only in this configuration is the maximal axial extension E3 of shift forks smaller than the axial extension E1 of the opening 241 to enable removal and assembly of the gearshift control unit 107, as illustrated in FIG. 3 where the gearshift control unit 107 under assembly or disassembly and therefore displaced a distance E4 from the exterior surface of the housing 240. Assuming that the standard position which shift actuators are controlled to occupy at transmission and/or engine shut down is the neutral position as shown in FIG. 2. Then the gearshift control unit would not be removable because the maximal axial extension E2 of the shift forks is here larger than the axial extension E1 of the opening 241. In this example, the gearshift actuators 270 must thus assume a position within a predetermined expected position range in order for the transmission control unit 107 to be mounted to the transmission housing 240.

The positions of the gearshift actuators may thus be automatically registered upon each power-up of the transmission for detecting any displacement of any actuator from an expected position. If the registered position of any of the gearshift actuators is outside a predetermined expected position range a calibration is performed on the position detection sensor. The predetermined expected position range may for example be +/− a certain distance from an expected position of the gearshift actuator, such as for example +/−2 millimetres from a centre of an expected position X.

According to an alternative approach, a calibration of the position detection sensors may be performed if the registered position of any of the gearshift actuators is within a predetermined abnormal position range. The abnormal position range may correspond to the area outside the predetermined expected position range defined above, such as for example a complete output range of a sensor except for a limited expected position range, e.g. Zero to X−2 mm and X+2 mm to infinity, where X corresponds to the centre of the expected range.

The act of comparing if the registered positions of the gearshift actuators correspond to predetermined values comprises analysing if the registered position lies within a predetermined range. This predetermined value is stored in a data memory of e.g. the gearshift control unit 107 or another suitable control unit such as e.g. a vehicle control unit, advantageously connected to the gearshift control unit 107 via e.g. a CAN bus 109.

Figure 4:
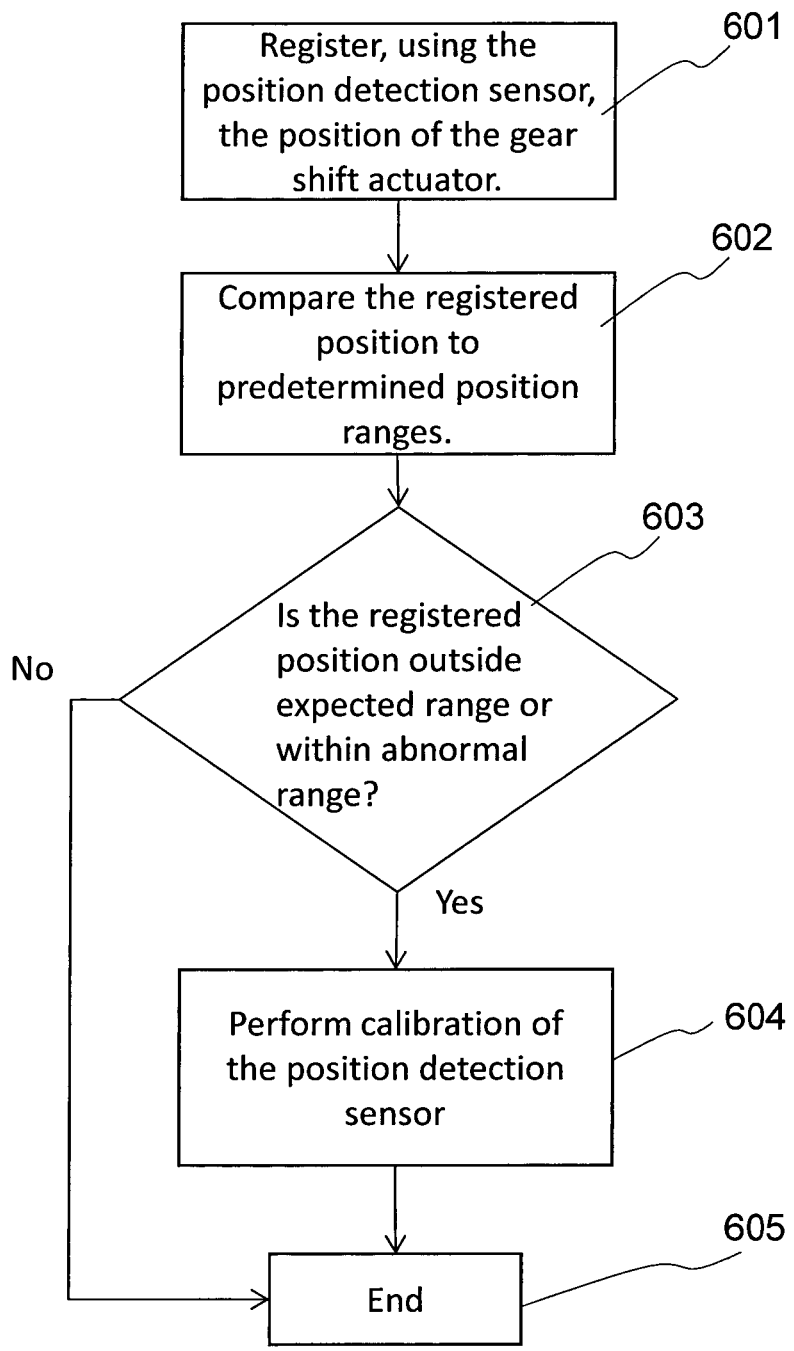
FIG. 4 shows a flowchart of the method.

FIG. 4 shows a flowchart describing the method according to the disclosure. The method begins with the step a step 601 of registering, at power-up of the transmission, using a position detection sensor, the position of at least one gearshift actuator. In a subsequent step 602, the registered position is compared to predetermined position range. In the following decision step 603 it is decided to perform the calibration if the result of the comparison showed that the registered position is outside an expected position range or within an abnormal position range. If yes the next step 604 involves calibration of the position detection sensor, of no the method ends.

It may be advantageous to only perform the calibration when the gearshift control unit 107 is mounted to the gearbox 103 in order to prevent possible injuries cause by the moving gearshift actuators during calibration. One way of automatically determining whether the gearshift control unit is mounted to the housing or not is to check if the communication cable such as CAN bus 109, is plugged into the gearshift actuator. If not the gearshift actuator is most likely dismounted or under repair.

The registering, comparison and calibration may be performed directly before or after engine start-up. Important is that the calibration is performed before use of the transmission for transmitting torque. The registering, comparison and calibration is preferably performed when the vehicle is at standstill to avoid any external noise.

Figure 5:
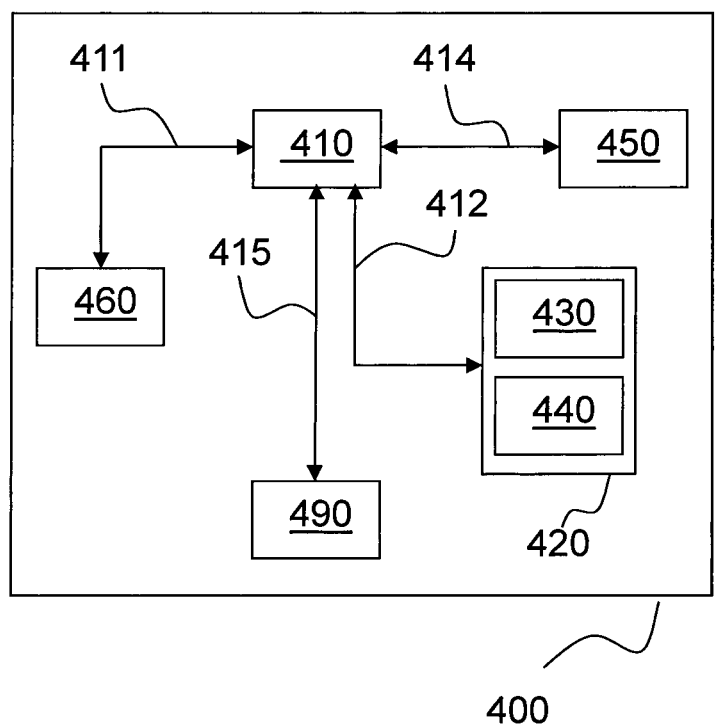
FIG. 5 shows a schematic of a computer system capable of performing the method.

The present invention also relates to a computer program, computer program product and a storage medium for a computer all to be used with a computer for executing said method. FIG. 5 shows the invention, applied on a computer arrangement. FIG. 5 shows an apparatus 400 according to one embodiment of the invention, comprising a nonvolatile memory 420, a processor 410 and a read and write memory 460. The memory 420 has a first memory part 430, in which a computer program for controlling the apparatus 400 is stored. The computer program in the memory part 430 fix controlling the apparatus 400 can be an operating system.

The apparatus 400 can enclose, for example, a control unit, such as a data-processing unit 410. The data-processing unit 410 can comprise, for example, a microcomputer. The memory 420 also has a second memory part 440, in which a program for automatic calibration of a position detection sensor according to the disclosure is stored. In an alternative embodiment, the program for automatic calibration of a position detection sensor is stored in a separate nonvolatile storage medium 450 for data, such as, for example, a CD or an exchangeable semiconductor memory. The program can be stored in an executable form or in a compressed state. When it is stated below that the data-processing unit 410 runs a specific function, it should be clear that the data-processing unit 410 is running a specific part of the program stored in the memory 440 or a specific part of the program stored in the nonvolatile storage medium 450.

The data-processing unit 410 is tailored for communication with the storage memory 450 through a data bus 414. The data-processing unit 410 is also tailored for communication with the memory 420 through a data bus 412. In addition, the data-processing unit 410 is tailored for communication with the memory 460 through a data bus 411. The data-processing unit 410 is also tailored for communication with a data port 490 by the use of a data bus 415. The method according to the present invention can be executed by the data-processing unit 410, by the data-processing unit

410 running the program stored in the memory 440 or the program stored in the nonvolatile storage medium 450.

Reference signs mentioned in the claims should not be seen as limiting the extent of the matter protected by the claims, and their sole function is to make the claims easier to understand.

As will be realised, the disclosure is capable of modification in various obvious respects, all without departing from the scope of the appended claims. Accordingly, the drawings and the description thereto are to be regarded as illustrative in nature, and not restrictive.

The invention claimed is:

1. Method for automatic calibration of a position detection sensor of an automatic transmission comprising a gearshift actuator, the method comprising:
   receiving a control command indicative of an actuating position of the gearshift actuator;
   comparing the actuating position with a predetermined disassembly position of the gearshift actuator for enabling the automatic transmission for disassembly;
   detecting that the automatic transmission is prepared for disassembly when the gearshift actuator is arranged in the predetermined disassembly position; and
   performing a calibration of the position detection sensor associated with the gearshift actuator when, upon power-up of the transmission, the gearshift actuator is prepared for disassembly.

2. A computer system for implementing a method for automatic calibration of a position detection sensor of an automatic transmission comprising a gearshift actuator, the method comprising:
   receiving a control command indicative of an actuating position of the gearshift actuator;
   comparing the actuating position with a predetermined disassembly position of the gearshift actuator for enabling the automatic transmission for disassembly;
   detecting that the automatic transmission is prepared for disassembly when the gearshift actuator is arranged in the predetermined disassembly position; and
   performing a calibration of the position detection sensor associated with the gearshift actuator when, upon power-up of the transmission, the gearshift actuator is prepared for disassembly.

3. Automatic transmission comprising a gearshift actuator, a position detection sensor, and a transmission control unit for controlling the gearshift actuator, wherein the control unit is arranged to perform automatic calibration of the position detection sensor by the step of:
   receiving a control command indicative of an actuating position of the gearshift actuator;
   comparing the actuating position with a predetermined disassembly position of the gearshift actuator for enabling the automatic transmission for disassembly;
   detecting that the automatic transmission is prepared for disassembly when the gearshift actuator is arranged in the predetermined disassembly position; and
   performing a calibration of the position detection sensor associated with the gearshift actuator when, upon power-up of the transmission, the gearshift actuator is prepared for disassembly.

* * * * *